United States Patent
Lange

[19]

[11] Patent Number: 6,155,614
[45] Date of Patent: Dec. 5, 2000

[54] LATCHING SYSTEM FOR AN AUTOMOTIVE VEHICLE CONVERTIBLE ROOF

[75] Inventor: Eric W. Lange, Dearborn, Mich.

[73] Assignee: ASC Incorporated, Southgate, Mich.

[21] Appl. No.: 09/181,512

[22] Filed: Oct. 28, 1998

Related U.S. Application Data

[63] Continuation-in-part of application No. 09/087,795, May 29, 1998.

[51] Int. Cl.[7] .............................. E05C 5/00; E05C 19/12
[52] U.S. Cl. .................................... 292/113; 292/DIG. 5; 292/98; 292/97; 292/56
[58] Field of Search ............................. 292/DIG. 5, 196, 292/197, 98, 97, 46–48, 56, 113; 296/121, 122, 120.1, 107.09

[56] References Cited

U.S. PATENT DOCUMENTS

| | | |
|---|---|---|
| 1,056,333 | 3/1913 | Hill . |
| 1,174,366 | 3/1916 | Van Den Plas . |
| 1,269,311 | 6/1918 | Rixon . |
| 1,831,494 | 11/1931 | Hynes et al. . |
| 1,905,814 | 4/1933 | Orlow . |
| 1,929,371 | 10/1933 | Hamilton . |
| 2,201,330 | 5/1940 | Wernig et al. . |
| 2,360,524 | 10/1944 | Simpson . |
| 2,372,583 | 3/1945 | Keller . |
| 2,468,251 | 4/1949 | Wiederman . |
| 2,486,905 | 11/1949 | Ackermans . |
| 2,560,459 | 7/1951 | Lundbert et al. . |
| 2,570,260 | 10/1951 | Milhan . |
| 2,570,261 | 10/1951 | Milhan . |
| 2,586,648 | 2/1952 | Hale et al. . |
| 2,596,355 | 5/1952 | Ackermans . |
| 2,674,480 | 4/1954 | Vigmostad . |
| 2,709,621 | 5/1955 | Votypka et al. . |
| 2,741,503 | 4/1956 | Thompson, III . |
| 2,753,202 | 7/1956 | Smith et al. . |

(List continued on next page.)

FOREIGN PATENT DOCUMENTS

| | | |
|---|---|---|
| 0 188 774 | 12/1985 | European Pat. Off. . |
| 0 429 006 A1 | 7/1992 | European Pat. Off. . |
| 0 494 366 A2 | 7/1992 | European Pat. Off. . |
| 805229 | 5/1951 | Germany . |
| 1505721 | 7/1970 | Germany . |
| 1 755 619 | 8/1971 | Germany . |
| 352786 | 7/1931 | United Kingdom . |
| 536578 | 5/1941 | United Kingdom . |
| WO/EP96/ 27509 | 3/1996 | WIPO . |

OTHER PUBLICATIONS

Photographs A1–A4 of Porsche 911 front header latch system (prior to Mar. 1994).

Photographs B1–B3 of Mercedes 500SL front header and tonneau cover cam and striker systems (prior to Mar. 1994).

ASC Drawing entitled "1990 Saab Convertible, Top Stack Assembly –Cover", W–63XO–4960–AXXX, Sheet No. 5, May 2, 1990.

ASC Drawing entitled "1990 Chrysler P–27 Convertible, Top Cover Assembly", W–39XO–4960–AXXX, Sheet No. 4F, May 15, 1990.

"Saab Owners Workshop Manual" by Haynes Publications, Inc., 1981, 1986, pp. 238–239.

Exhibit A, photographs of BMW 318i convertible roof latch, prior to Oct. 28, 1998.

*Primary Examiner*—Lynne H. Browne
*Assistant Examiner*—John B Walsh
*Attorney, Agent, or Firm*—Harness, Dickey & Pierce, P.L.C.

[57] ABSTRACT

A latching system for an automotive vehicle convertible roof employs a slide having a camming surface which is operably movable in a generally linear direction for moving a cam follower which, in turn, causes a linkage mechanism to pivot a latch. In a further aspect of the present invention, a centrally mounted actuator operably drives a pair of linear slides in a generally cross-car direction for operating a pair of hook-like latches.

19 Claims, 10 Drawing Sheets

U.S. PATENT DOCUMENTS

| | | |
|---|---|---|
| 2,785,914 | 3/1957 | Thomas et al. . |
| 2,831,718 | 4/1958 | Hallek et al. . |
| 2,852,292 | 9/1958 | Galla . |
| 2,856,231 | 10/1958 | Zeman . |
| 2,879,988 | 3/1959 | Klisch . |
| 2,886,364 | 5/1959 | Smith . |
| 2,916,327 | 12/1959 | Gilson . |
| 2,926,943 | 3/1960 | Leslie et al. . |
| 3,004,788 | 10/1961 | Dully et al. . |
| 3,089,719 | 5/1963 | Csizmansky . |
| 3,135,541 | 6/1964 | Kwasek . |
| 3,151,375 | 10/1964 | Schevenell . |
| 3,353,864 | 11/1967 | Antaya et al. . |
| 3,362,740 | 1/1968 | Burns . |
| 3,375,037 | 3/1968 | Hunt, Jr. . |
| 3,425,742 | 2/1969 | Rauber, Jr. . |
| 3,443,834 | 5/1969 | Andres . |
| 3,712,665 | 1/1973 | Klein . |
| 3,751,949 | 8/1973 | Castle . |
| 3,891,252 | 6/1975 | Lehmann . |
| 4,537,440 | 8/1985 | Brockway et al. . |
| 4,618,180 | 10/1986 | Muscat . |
| 4,664,436 | 5/1987 | Eyb . |
| 4,702,505 | 10/1987 | Alexander . |
| 4,720,133 | 1/1988 | Alexander et al. . |
| 4,746,163 | 5/1988 | Muscat . |
| 4,801,173 | 1/1989 | Trenkler . |
| 4,817,999 | 4/1989 | Drew . |
| 4,830,425 | 5/1989 | Muscat . |
| 4,830,426 | 5/1989 | Schlachter et al. . |
| 4,854,634 | 8/1989 | Shiraishi et al. . |
| 5,033,789 | 7/1991 | Hayashi et al. . |
| 5,042,869 | 8/1991 | Brin . |
| 5,046,767 | 9/1991 | Muscat . |
| 5,058,939 | 10/1991 | Miilu . |
| 5,064,241 | 11/1991 | Ohrle . |
| 5,067,768 | 11/1991 | Fischbach . |
| 5,085,483 | 2/1992 | Alexander . |
| 5,154,479 | 10/1992 | Sautter, Jr. . |
| 5,186,516 | 2/1993 | Alexander . |
| 5,267,769 | 12/1993 | Bonne et al. . |
| 5,269,586 | 12/1993 | Hahn et al. . |
| 5,301,987 | 4/1994 | Tokarz et al. . |
| 5,328,229 | 7/1994 | Brandt et al. . |
| 5,413,390 | 5/1995 | Filippi . |
| 5,429,409 | 7/1995 | Corder et al. . |
| 5,489,146 | 2/1996 | Fischbach . |
| 5,620,226 | 4/1997 | Sautter, Jr. . |
| 5,624,149 | 4/1997 | Tokarz . |
| 5,678,881 | 10/1997 | Tokarz . |
| 5,755,467 | 5/1998 | Dilluvio et al. . |

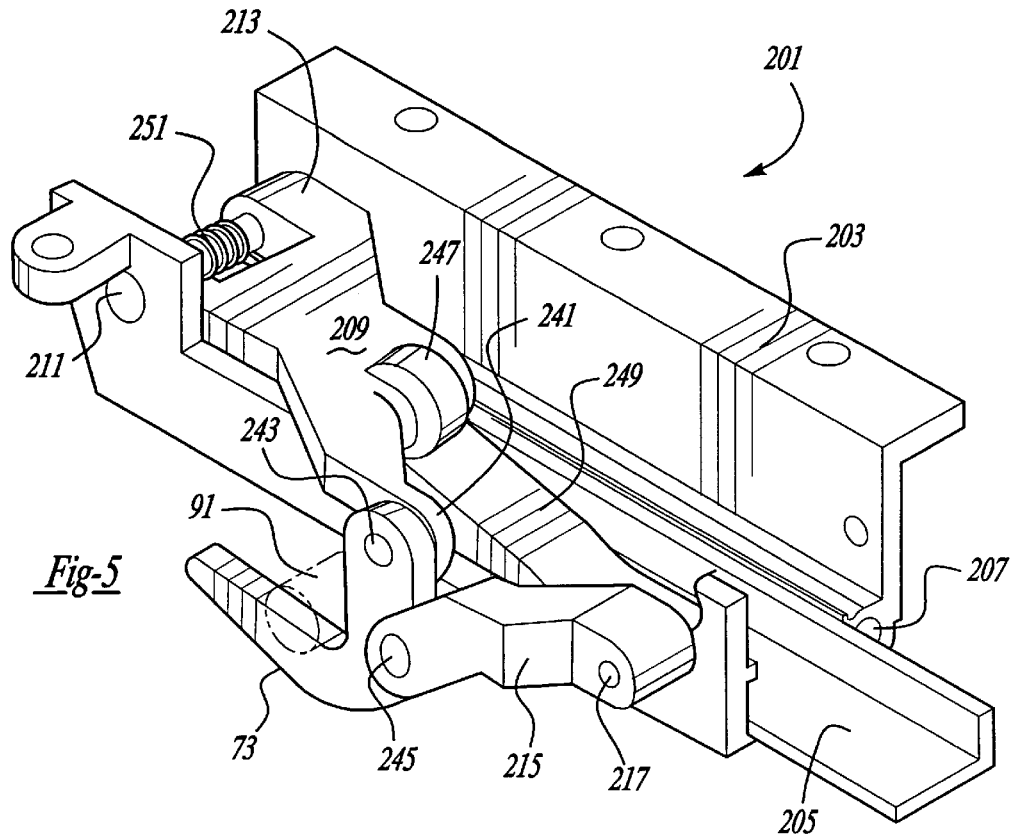
_Fig-5_
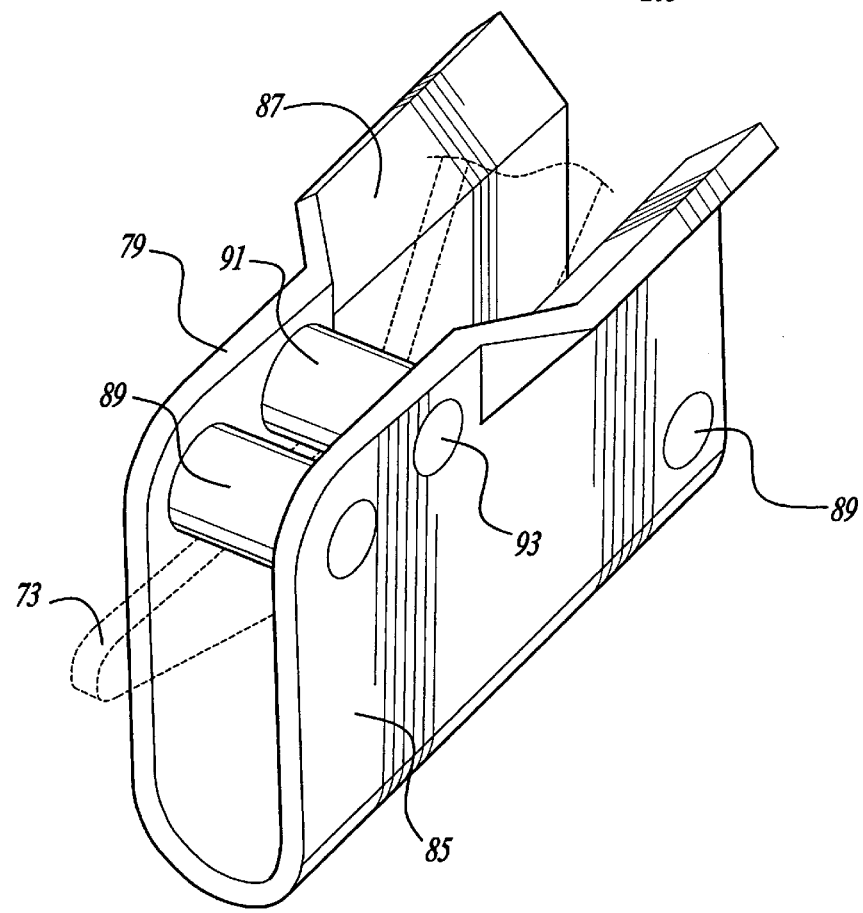
_Fig-7_

LATCHING SYSTEM FOR AN AUTOMOTIVE VEHICLE CONVERTIBLE ROOF

CROSS REFERENCE TO RELATED APPLICATIONS

This application is a continuation-in-part of co-pending U.S. Ser. No. 09/087,795, entitled "Convertible Roof Actuation Mechanism," which was filed on May 29, 1998, and is incorporated by reference herein.

BACKGROUND AND SUMMARY OF THE INVENTION

This invention pertains generally to automotive vehicle roof systems and more specifically to a latching system for an automotive vehicle convertible roof.

Most convertible roofs have a latching device for disengagably securing a number one roof bow of a convertible roof to a stationary front header panel above a windshield. It is known to employ a centrally mounted handle or electric motor for linearly moving or rotating a pair of catches or hooks. Examples of such devices are disclosed in U.S. Pat. No. 5,755,467 entitled "Latching and Switch Operating System for a Convertible Roof" which issued to Dilluvio et al. on May 26, 1998; U.S. Pat. No. 5,678,881 entitled "Apparatus and Method for Securing a Convertible Roof to an Automotive Vehicle" which issued to Tokarz on Oct. 21, 1997; U.S. Pat. No. 5,269,586 entitled "Device for Lowering the Free End of a Vehicle Cover" which issued to Hahn et al. on Dec. 14, 1993; German 805 229 and United Kingdom 536,578.

Furthermore, another traditional convertible roof latching device employs a pair of jack screws that drive a bushing and two associated links to rotate a hook-like latch. Concurrently, the bushing movement causes a vertical rod to slide along an approximately three inch long camming slot, oriented in a generally cross-car direction, for moving an arm in a generally fore and aft direction. The arm operably pivots a front rail and number one roof bow section of the roof relative to a center rail section of the roof assembly. This is a very heavy, expensive and complicated latching device.

In accordance with the present invention, a preferred embodiment of a latching system for an automotive vehicle convertible roof employs a slide having a camming surface which is operably movable in a generally linear direction for moving a cam follower which, in turn, causes a linkage mechanism to pivot a latch. In a further aspect of the present invention, a centrally mounted actuator operably drives a pair of linear slides in a generally cross-car direction for operating a pair of hook-like latches. Yet another aspect of the present invention mounts a latch to a retractable number one roof bow of a convertible roof for disengagably fastening to a relatively stationary front header panel. A method of operating a convertible roof latching system is also provided.

The latching system of the present invention is advantageous over conventional devices in that the present invention harnesses the mechanical advantage of a linkage mechanism with offset pivots driven by a linearly moving cam. Thus, the present invention causes a strong convertible roof pull down and fastening action while exhibiting a relatively simple, compact, lightweight and inexpensive construction. The movement of the present invention latch is enhanced due to the cross-car movement of the cam in combination with rotation of the cammed linkage mechanism. Additional advantages and features of the present invention will become apparent from the following description and appended claims, taken in conjunction with the accompanying drawings.

BRIEF DESCRIPTION OF THE DRAWINGS

FIG. 5 is a top perspective view showing the preferred embodiment latching system;

FIG. 7 is a top perspective view showing a receptacle of the preferred embodiment latching system;

DETAILED DESCRIPTION OF THE PREFERRED EMBODIMENT

Figure 1:
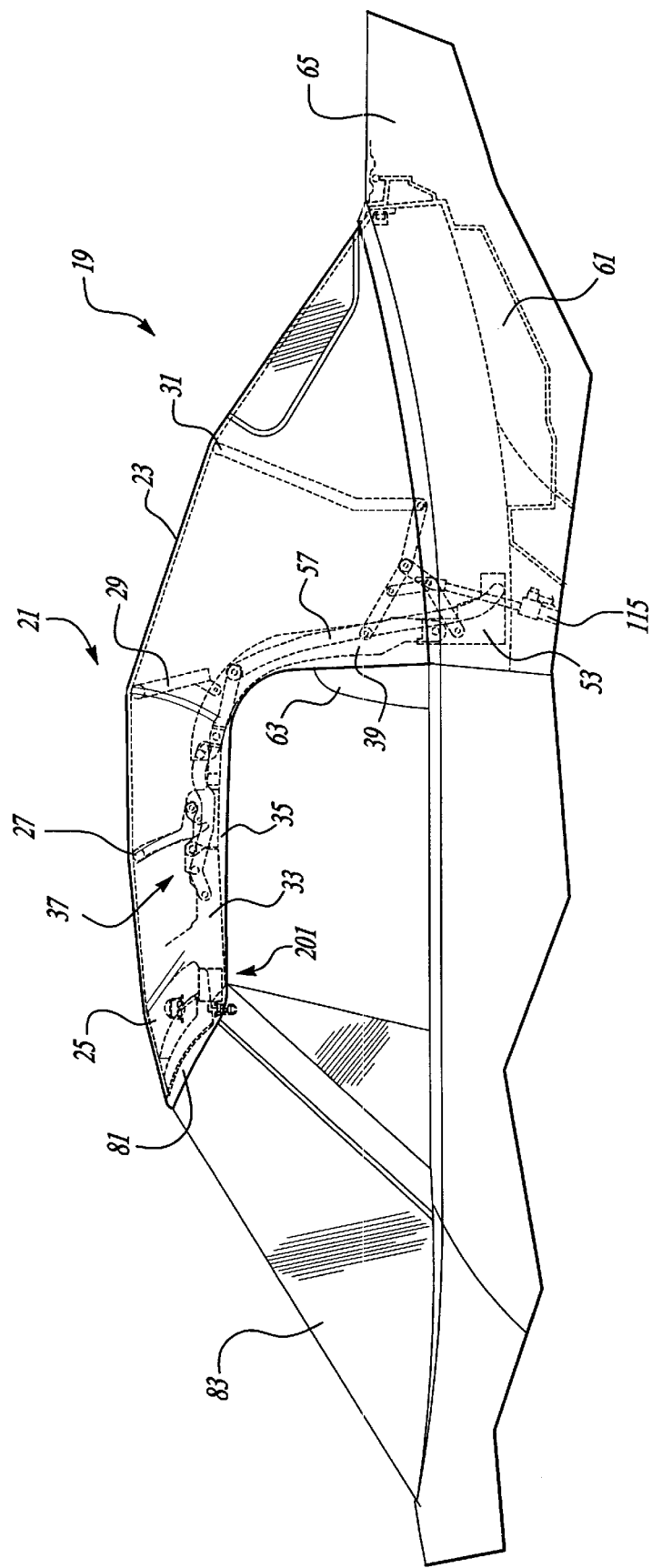
FIG. 1 is a side elevational view showing an automotive vehicle convertible roof employing the preferred embodiment latching system of the present invention.
Figure 2:
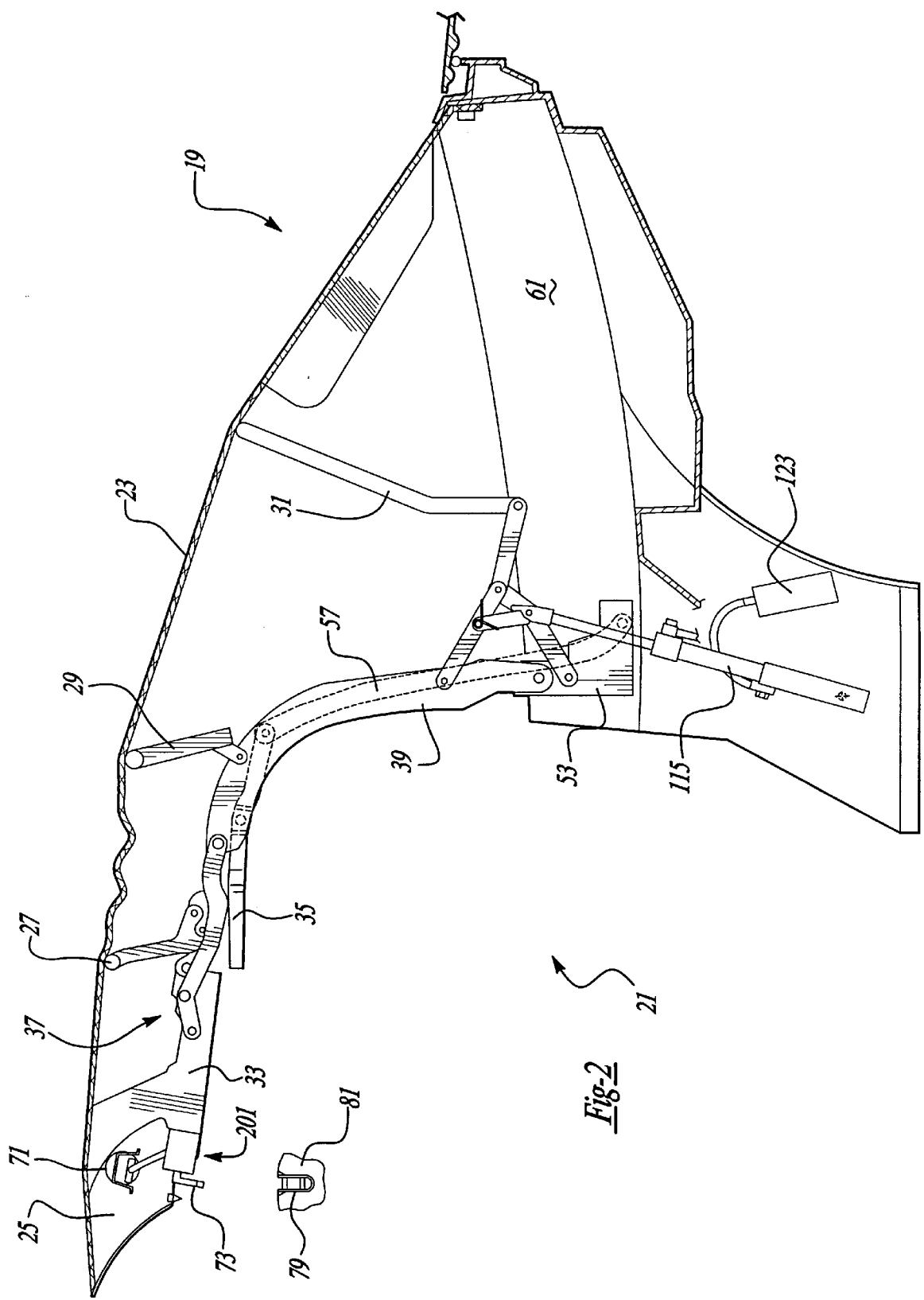
FIG. 2 is a cross sectional view, taken along the longitudinal center line of the vehicle, showing the convertible roof and preferred embodiment latching system disposed in a partially retracted position.
Figure 3:
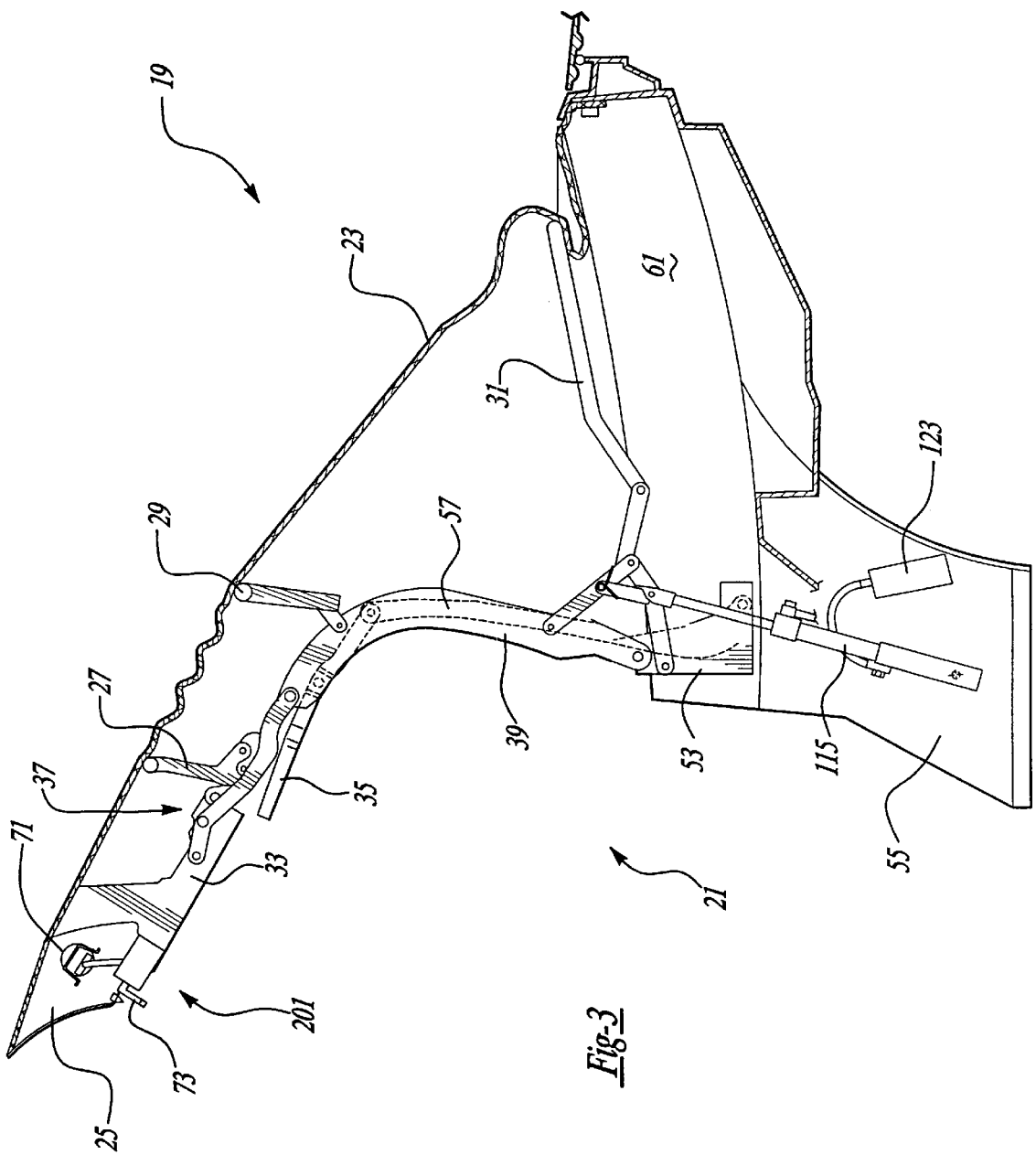
FIG. 3 is cross sectional view, taken along the longitudinal centerline of the vehicle, showing the convertible roof and preferred embodiment latching system disposed in a more fully retracted position.

As can be observed in FIGS. 1–3, a soft-top convertible roof 19 for an automotive vehicle includes a top stack mechanism 21 and a pliable or flexible roof cover 23. Top stack mechanism 21 employs a number one roof bow 25, a number two roof bow 27, a number three roof bow 29 and a number four roof bow 31. Number one roof bow 25 is preferably integrally cast from an aluminum or magnesium alloy with a pair of front roof rails 33. A pair of center roof rails 35 are pivotably coupled to front roof rails 33 by over-center control linkage assemblies 37. Furthermore, a pair of rear roof rails 39 are coupled to center roof rails 35. A bottom pivot of each rear roof rail 39 is coupled for movement to a main pivot bracket 53 which is bolted or welded onto a stationary structure affixed to a body panel 55 of the automotive vehicle. A pair of balance links 57 each have a first end pivotably coupled to bracket 53 and a second end pivotably coupled to each center roof rail 35. Rear roof rail 39 is preferably die cast and subsequently machined from an aluminum or magnesium alloy while balance link 57 and the rear bows are made from a carbon steel tubing with swaged ends. Main pivot bracket 53 is stamped from steel or is cast from aluminum or magnesium.

A piston cylinder 115 of a top stack actuator is fluidically coupled to a hydraulic pump 123. Pump 123 is electrically connected to a rear roof rail-to-bracket position sensing micro switch, a front roof rail-to-center roof rail positioning sensing micro switch, an occupant accessible top up/down switch and an electronic control unit. Piston cylinder 115 is allowed to pivot about a lower pivot point in relation to the vehicle's body panel 55. Accordingly, the convertible roof 19 can be automatically moved from a fully extended and raised position above a passenger compartment to a fully retracted and stowed position within a storage compartment or boot well 61. Boot well 61 is longitudinally located between a front occupant seat 63 and a trunk 65.

Figure 4:
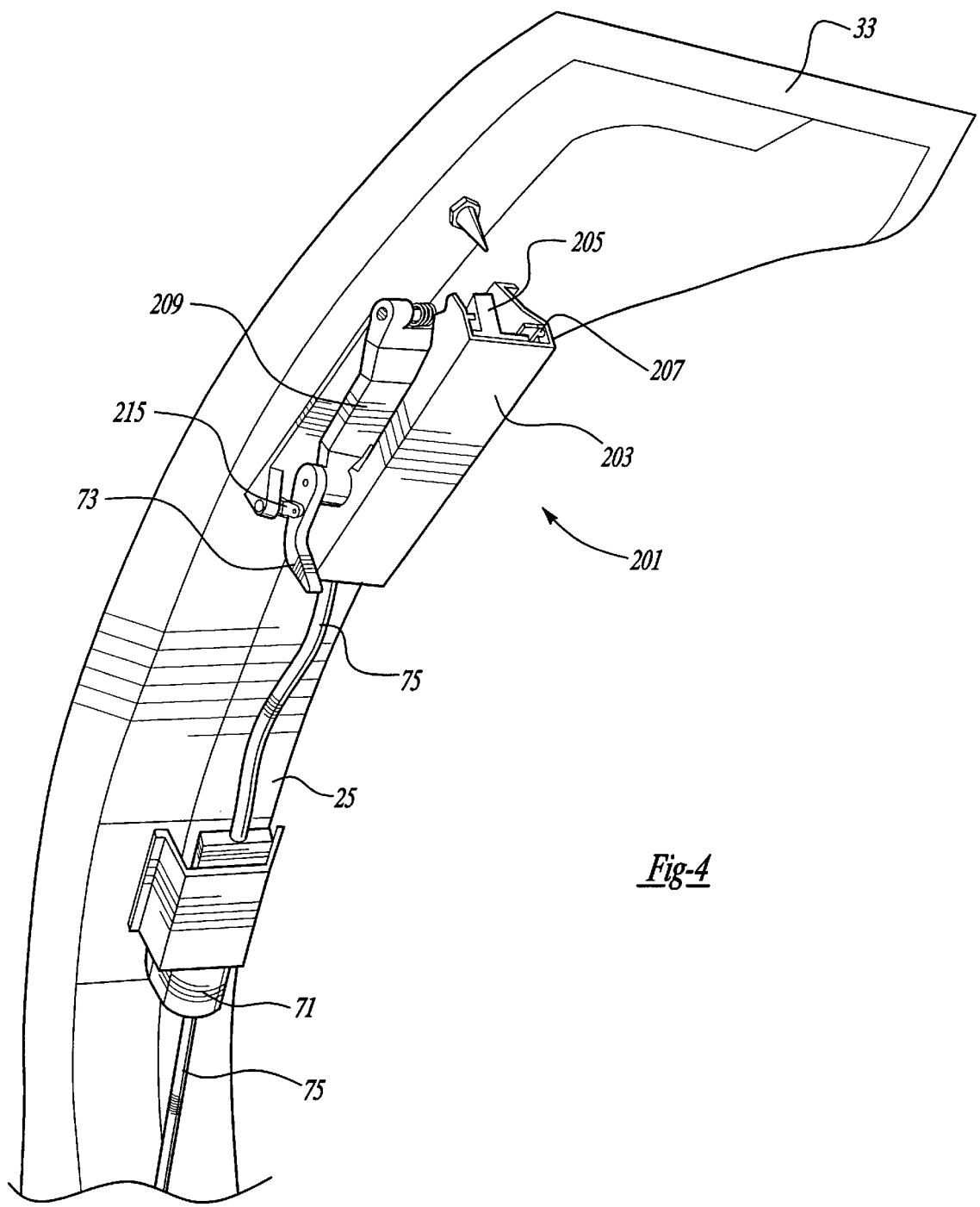
FIG. 4 is a bottom perspective view showing the preferred embodiment latching system.
Figure 11:
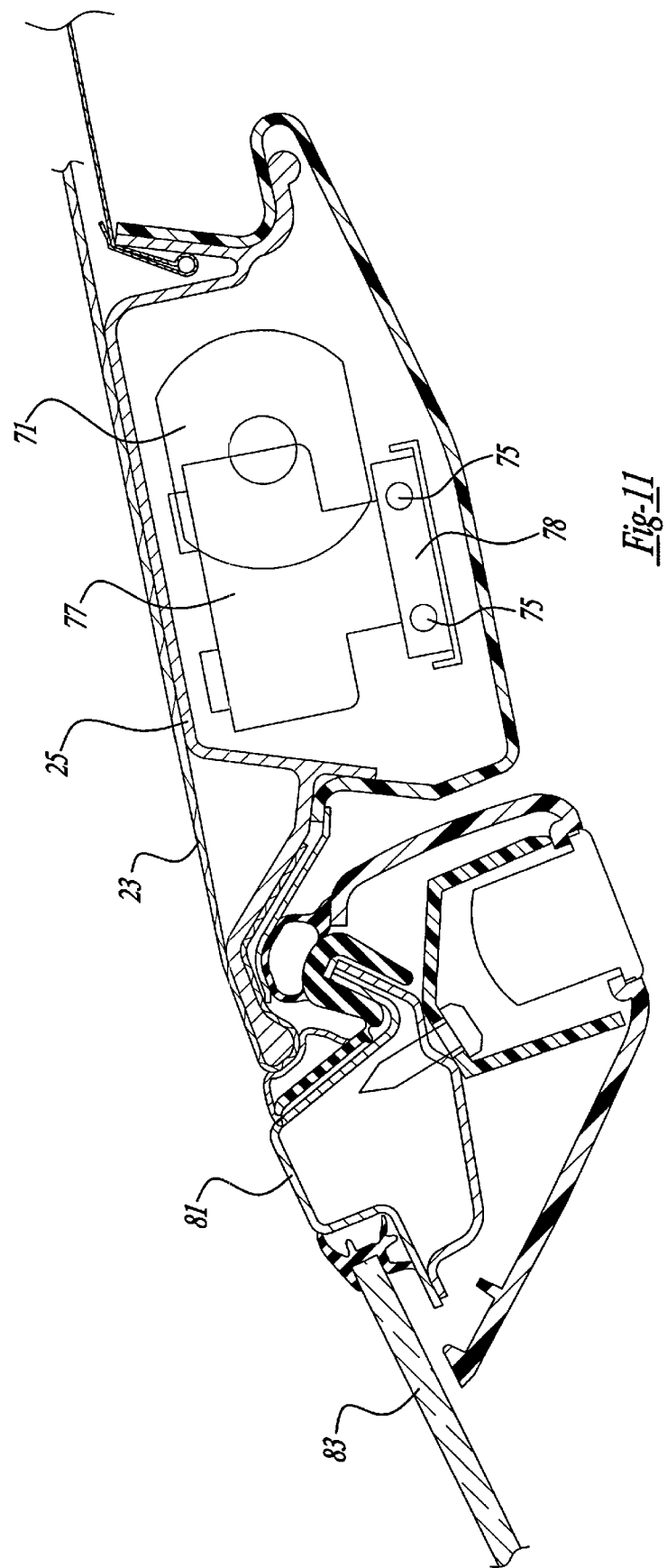
FIG. 11 is a cross sectional view, taken along the longitudinal center line of the vehicle, showing a portion of the convertible roof and an actuator of the preferred embodiment latching system.

Referring to the preferred embodiment of FIGS. 4, 7 and 11, a single, fractional horsepower, direct current electric motor actuator 71, centrally mounted to number one roof bow 25, is energized to push and pull sunroof-type cables 75 inside protective sheaths for driving a pair of outboard rotating latches 73. Cables 75 are driven by a gear located in a gear housing 77 coupled to a powdered metal, cable guide block 78. Latches 73 are operably rotated along generally vertical, transverse planes to engage latching receptacle structures 79 mounted to a front header panel 81 disposed above a windshield 83. Each stamped steel receptacle has a U-shaped body section 85 and a flared entryway 87. A pair of annular hollow spacers 89 receive bolts for mounting each receptacle 79 to header panel 81. A striker 91 for engaging an inside edge of the respective latch 73, includes a circular-cylindrical steel roller located about a rigidly secured pin 93.

FIGS. 4 and 5 best illustrate each latch assembly 201. An extruded and machined aluminum housing 203 is bolted or riveted to an underside of number one roof bow 25. Housing 203 contains a linearly moving cam or slide 205 which is fastened to cable 75 running in a C-shaped channel 207. A primary link 209, cast from steel, is pivotably coupled to housing 203 by a rivet or clevis pin 211 at a bifurcated proximal end 213. A secondary machined steel link 215 is also pivotably coupled to housing 203 by a rivet or clevis pin 217. A main end of hook-like latch 73 is rotatably mounted to a distal end 241 of primary link 209 at pivot 243. A middle section of latch 73 is rotatably coupled to secondary link 215 at pivot 245. Latch 73 is machined from stamped steel. A steel roller 247 acts as a cam follower and is rotatably affixed to primary link 209 for riding along a camming surface 249 of slide 205. A torsion spring 251 is mounted upon pin 211 for biasing the linkage assembly and latch to an unlatched position.

Figure 6:
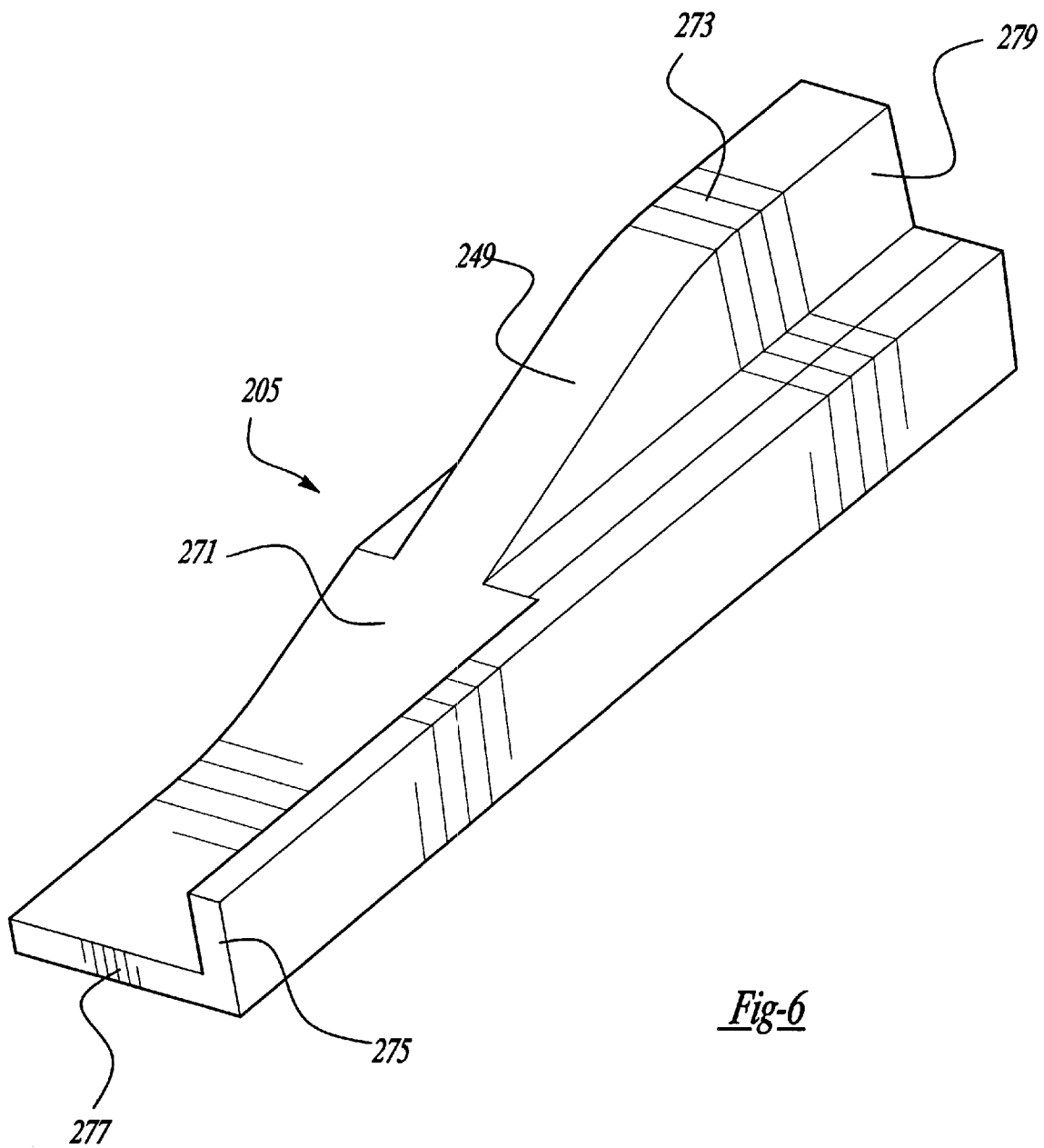
FIG. 6 is a top perspective view showing a slide of the preferred embodiment latching system.

Referring now to FIG. 6, the camming surface 249 of each slide 205 has a curved and tapered leading segment 271, inwardly pointing toward motor 71 (see FIG. 4) which is disposed at the longitudinal centerline of the vehicle. Camming surface 249 further has an upper segment 273 which is generally flat and horizontal. An upstanding side wall 275 projects from a base 277 thereby defining a tipped, generally L-shaped end. Base 277 is thickened toward the opposite end of slide 205 such that a generally inverted T-shape is formed between a center wall 279, carrying a portion of camming surface 249, and base 277. The bottom of base 277 is flat. Slide 205 is injection molded from an engineering thermoplastic such as nylon, Delrin® or Hyvalloy™ polymeric resin.

Figure 8:
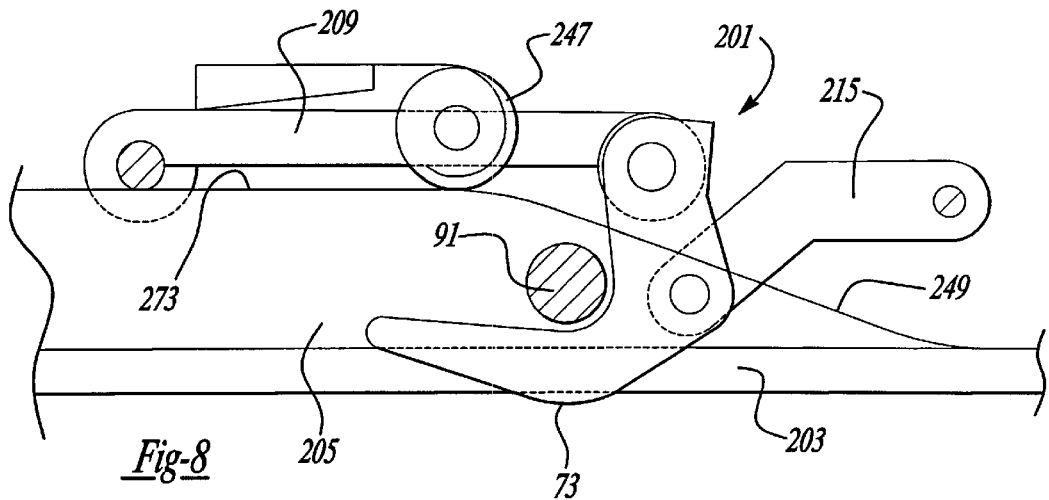
FIG. 8 is a rear diagrammatic view showing the preferred embodiment latching system disposed in a fully latched position.
Figure 9:
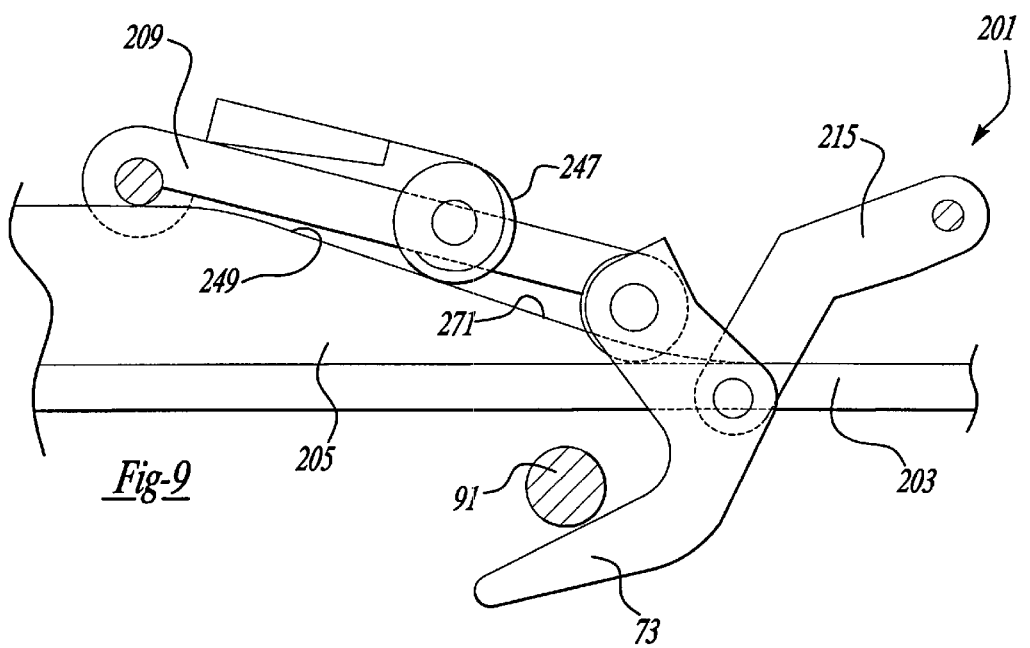
FIG. 9 is a rear diagrammatic view showing the preferred embodiment latching system disposed in a pulled down and partially latched position.
Figure 10:
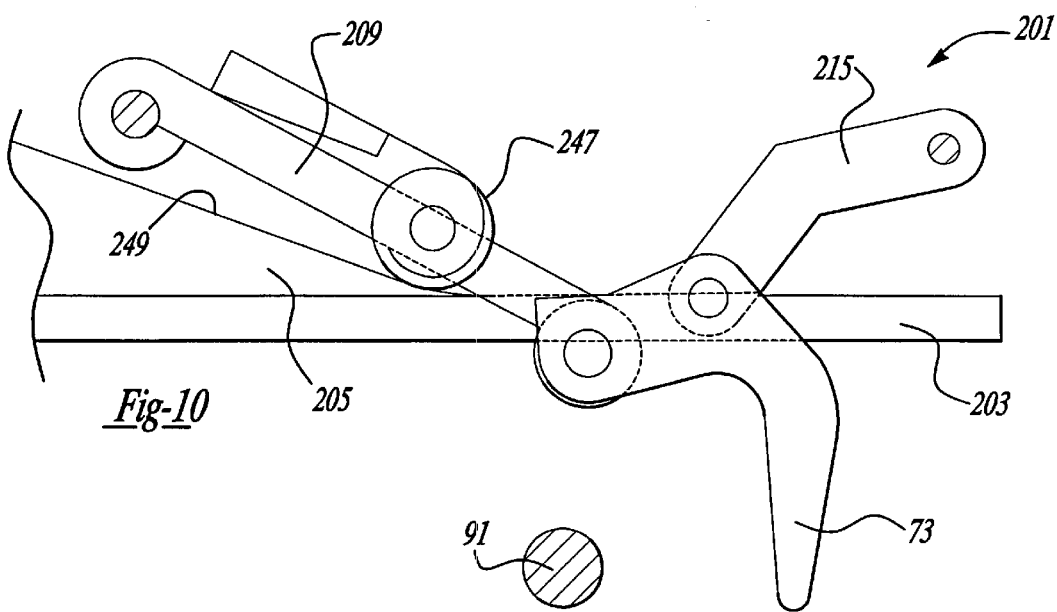
FIG. 10 is a rear diagrammatic view showing the preferred embodiment latching system disposed in an unlatched position.

The operation of each latching assembly 201 is illustrated in FIGS. 8–10. The electric motor tensions the cables for latching and compresses the cables for unlatching latches 73 through camming slides 205, which transversely slide in a cross-car manner thereby lifting toggling linkage assemblies for rotating latches 73. For example, FIG. 8 shows roller 247 located on the upper segment 273 of slide 205. This causes latch 73 to be disposed in the fully latched position. However, as roller 247 is vertically moved down tapered segment 271 of slide 205, as slide 205 is pushed away from the vehicle centerline, links 209 and 215 serve to rotate and lower latch 73 toward an open position, as is illustrated in FIG. 9. FIG. 10 shows links 209 and 215, as well as hook 73 in the fully unlatched position when slide 205 has been fully retracted. Conversely, advancement of slide 205 from the position of FIG. 10 to that of FIG. 8 causes hook 73 to mechanically pull down the number one roof bow and adjacent portion of the convertible roof by about forty millimeters when it engages striker 91. Yet hook 73 nests within a very small space when fully engaged.

A set of micro switches or proximity switches are mounted on the number one roof bow to sense the engagement of the latches to the front header receptacles, thereby deenergizing motor and also sending an electric signal to a microprocessor, or an analog or solid state based electronic control unit. The microprocessor then automatically actuates the hydraulic actuator for subsequently moving the number four roof bow and topstack mechanism.

Figure 12:
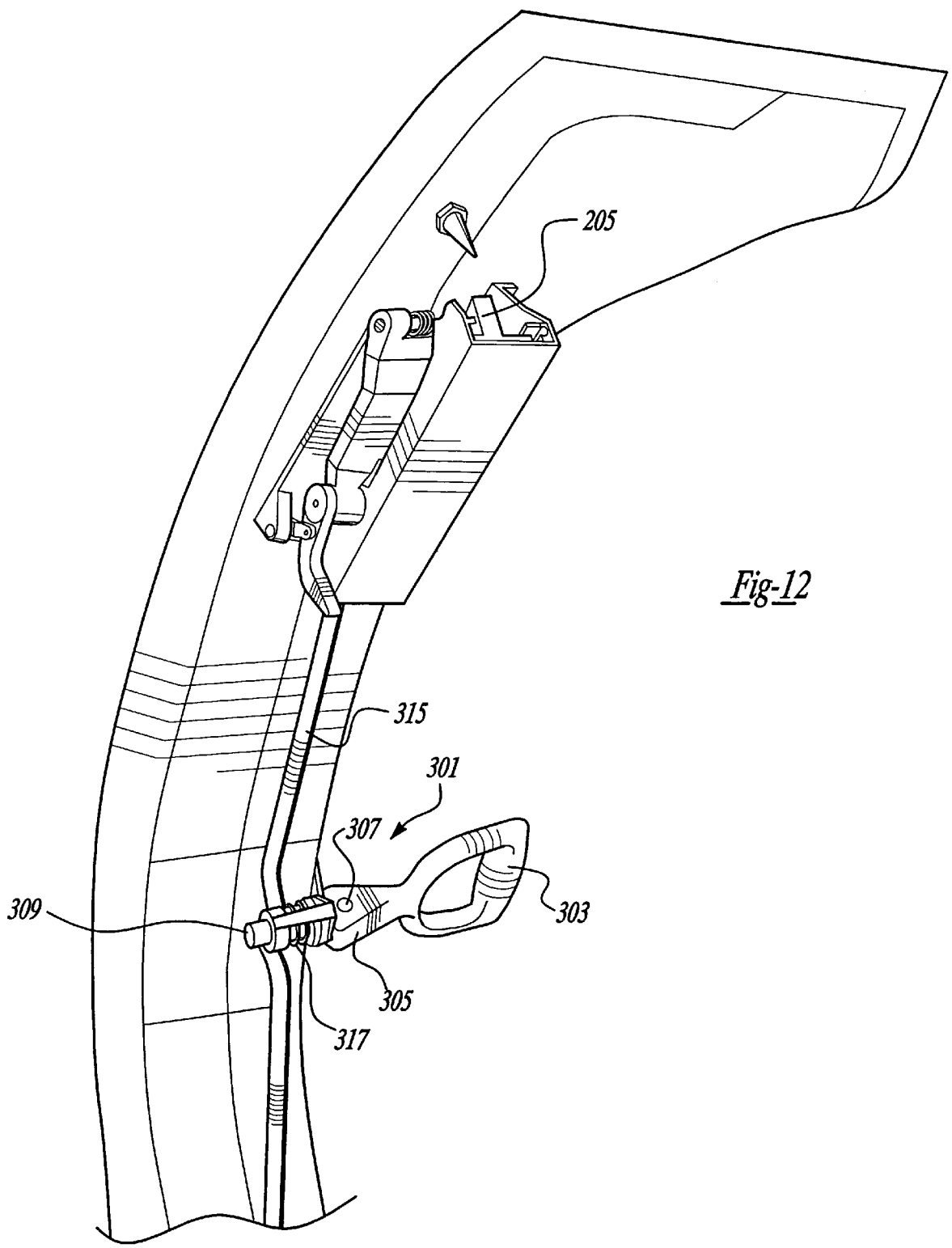
FIG. 12 is a bottom perspective view showing an alternate embodiment latching system.
Figure 13:
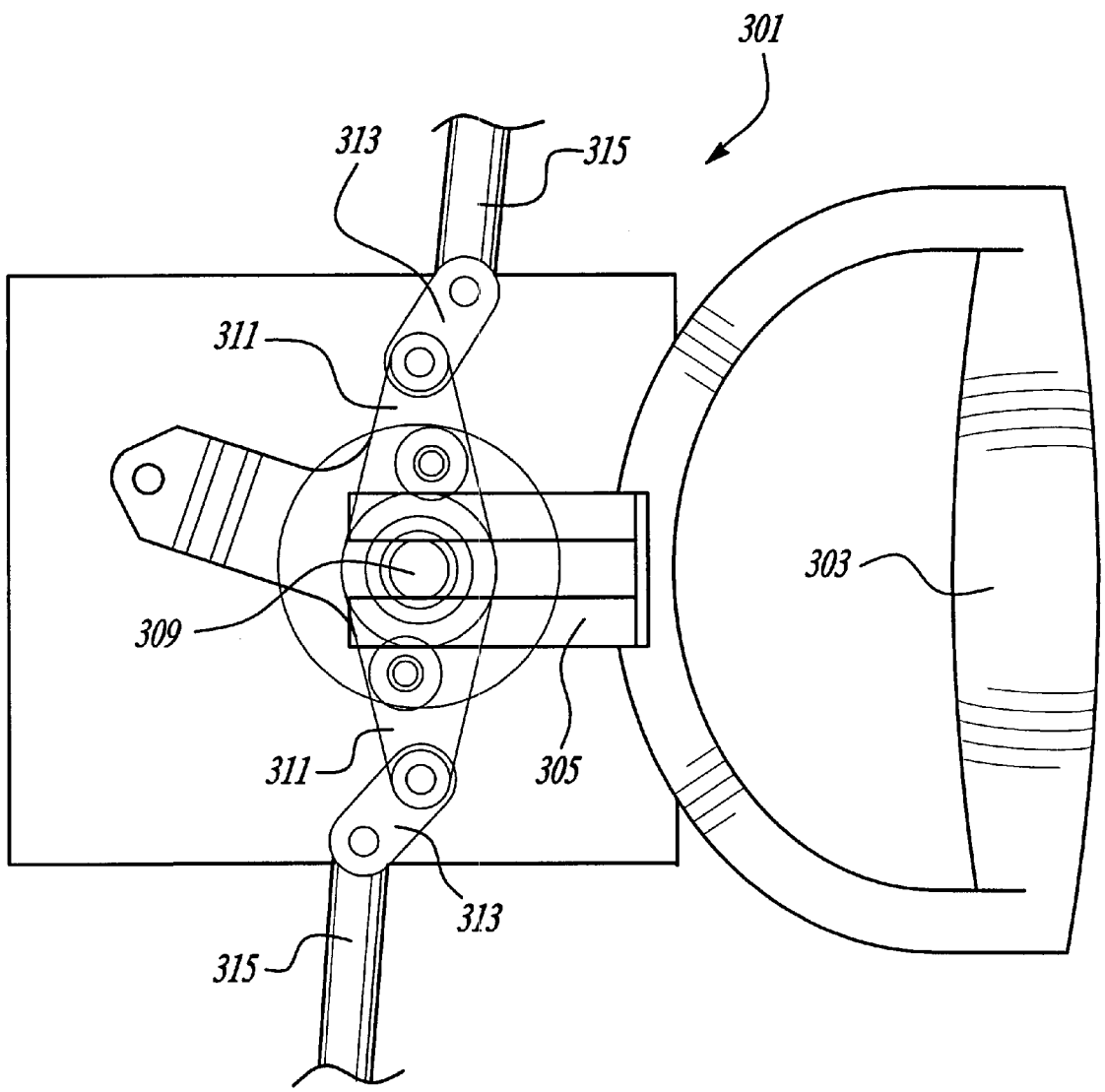
FIG. 13 is a bottom elevational view showing the actuator of the alternate embodiment latching system.

An alternate embodiment convertible roof latching system is shown in FIGS. 12 and 13. The outboard latches are the same as for the preferred embodiment, however, a manually operated actuator 301 is employed in place of the preferred electric motor. Actuator 301 of the present embodiment includes a D-shaped handle 303 mounted to a shaft 305. Handle 303 can be stowed up against the underside of the roof when not in use or pulled downward about pivot 307 for subsequent rotation about rod 309. A compression spring 317 serves to bias handle 303 toward the downward use position. Rotation of handle 303 causes a concurrent rotation of tabs 311 which pull adjacent couplings 313. Couplings 313 are pivotably connected to rigid steel shafts 315 connected to slides 205 in place of the preferred cables.

While various aspects of the preferred embodiment latching system have been disclosed, it should be appreciated that various other embodiments may be employed in combination with the present invention. For example, the latch, links or slide may have differing shapes. Furthermore, additional links may be employed as long as the same linear camming slide and rotating latch functions are achieved. Moreover, it is also envisioned that the latching system and actuator can be mounted to the stationary front header for engaging a number one roof bow-mounted striker. Additionally, the latching system can be used to secure the rearmost roof bow to a tonneau cover panel or quarter panel. While various materials have been disclosed, other materials can be readily used. It is intended by the following claims to cover these and any other departures from the disclosed embodiments which fall within the true spirit of this invention.

The invention claimed is:

1. An apparatus for use in an automotive vehicle having a roof, the apparatus comprising:

a first slide having a camming surface, said first slide being operably movable in a substantially linear direction;

a cam follower operably engaging the camming surface;

a latch pivotable from a latched position to an unlatched position in response to the cam follower riding along the camming surface when the first slide is moved in the substantially linear direction;

a first link pivotable relative to the roof, the cam follower being mounted to the first link, the first link also being pivotably coupled to the latch; and a second link pivotably coupled to the roof, the second link also being pivotably coupled to the latch at a point offset from the first link.

2. The apparatus of claim 1 further comprising a movable roof and a body of the vehicle, the latch disengagably fastening a portion of the roof to the body, and a pivot of the latch movable in a substantially vertical direction to pull the roof toward the body portion to complete fastening.

3. The apparatus of claim 2 wherein the substantially linear direction is a cross-car direction.

4. The apparatus of claim 1 wherein the camming surface is an external edge of the slide.

5. The apparatus of claim 1 further comprising:

a panel elongated in a substantially cross-car direction;

a second slide mounted adjacent a first outboard portion of the panel, the first slide being mounted adjacent to and on an opposite second outboard portion of the panel from the second slide; and an actuator mounted to a substantially central portion of the panel, the actuator operably moving the slides relative to the panel.

6. The apparatus of claim 5 further comprising a set of elongated cables coupling the slides to the actuator.

7. The apparatus of claim 1 further comprising a convertible roof, the first slide and the latch being moveably retractable with the convertible roof.

8. The apparatus of claim 1 wherein the latch has a hook-like shape.

9. An apparatus for use in an automotive vehicle, the apparatus comprising:

a first slide including a substantially flat and enlarged base and a substantially tapered section projecting from the base, a top edge of the tapered section serving as at least part of a camming surface, said first slide being operably movable in a substantially linear direction;

a cam follower operably engaging the camming surface; and a latch pivotable from a latched position to an unlatched position in response to the cam follower riding along the camming surface when the slide is moved in the substantially linear direction.

10. The apparatus of claim 9 further comprising:

a roof;

a first link pivotable relative to the roof, the cam follower being mounted to the first link, the first link also being pivotably coupled to the latch; and a second link pivotably coupled to the roof, the second link also being pivotably coupled to the latch at a point offset from the first link.

11. An automotive vehicle having a convertible roof assembly, the automotive vehicle comprising:

a panel elongated in a cross-car manner;

a set of hook-like latches rotatable from unlatching positions to latching positions;

linkage assemblies pivotably coupled to the latches, each of the linkage assemblies including:
(a) a primary link having a first pivot coupled to the cross-car panel and having a second pivot coupled to an end of the respective latch; and
(b) a secondary link having a first pivot coupled to the cross-car panel and having a second pivot coupled to a median portion of the respective latch;

camming members movable in a substantially cross-car manner to move the linkage assemblies which rotate the latches; and a single actuator operably moving the camming members.

12. The automotive vehicle of claim 11 further comprising a main pivot of each latch vertically moving in response to movement of the respective linkage assembly.

13. The automotive vehicle of claim 11 further comprising a housing coupling the first pivots of the links to the cross-car panel.

14. The automotive vehicle of claim 11 further comprising a cam follower mounted to each of the primary links serving to engage the respective camming member.

15. A convertible roof latching system for an automotive vehicle, the system comprising a slide including:

a base having an upstanding side wall defining a substantially L-shaped first end;

a curved camming surface projecting from the base;

a first section of the camming surface located below a distal edge of the wall; and a second section of the camming surface located beyond the distal edge of the wall and defining a substantially inverted T-shaped second end.

16. The system of claim 15 further comprising:

a hook; and a cam follower riding on the camming surface for operably moving the hook.

17. The system of claim 16 wherein the slide moves in a linear manner to rotate the hook.

18. A method of operating a convertible roof latching system for an automotive vehicle having a slide, a cam follower, a linkage mechanism and a latch, the method comprising:

(a) linearly moving the slide in a substantially cross-car direction;

(b) moving the cam follower in a substantially vertical manner in response to step (a);

(c) rotating the linkage mechanism; and (d) rotating the latch about at least two offset pivots coupled to at least two links of the linkage mechanism, in response to step (c).

19. The method of claim 18 further comprising:

(a) engaging a striker mounted to a front header panel with the latch, the latch having a hook-like shape; and (b) camming the cam follower on an external edge of the slide to vertically move the cam follower.

* * * * *

UNITED STATES PATENT AND TRADEMARK OFFICE
CERTIFICATE OF CORRECTION

PATENT NO. : 6,155,614  
DATED : December 5, 2000  
INVENTOR(S) : David W. Lange Page 1 of 1

It is certified that error appears in the above-identified patent and that said Letters Patent is hereby corrected as shown below:

Title page,
U.S. PATENT DOCUMENTS, "2,741,503  4/1956" should be -- Re. 24,375 10/1957 --.

Column 2,
Line 14, after "is" insert -- a --.

Signed and Sealed this

Ninth Day of April, 2002

Attest:

JAMES E. ROGAN  
*Director of the United States Patent and Trademark Office*

*Attesting Officer*